Oct. 16, 1945.   H. W. JEWELL   2,386,865
PIPE JOINT AND DEVICE THEREFOR
Filed Dec. 20, 1943   2 Sheets-Sheet 1
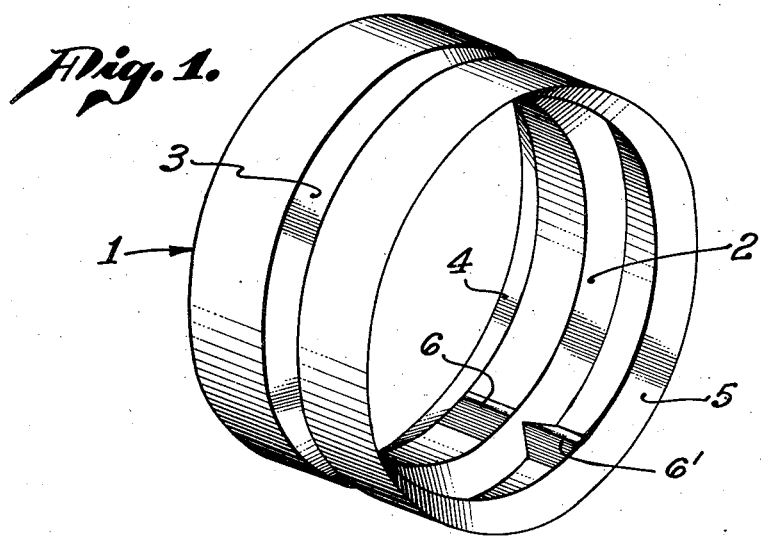
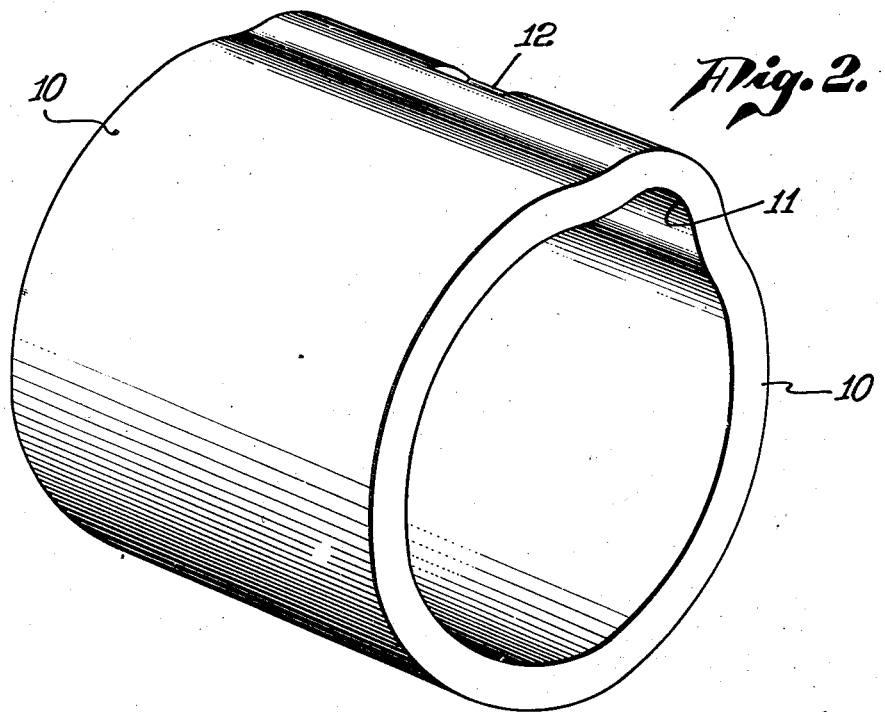
INVENTOR.
HOWARD W. JEWELL,
BY
ATTORNEY.

Oct. 16, 1945.   H. W. JEWELL   2,386,865
PIPE JOINT AND DEVICE THEREFOR
Filed Dec. 20, 1943   2 Sheets-Sheet 2
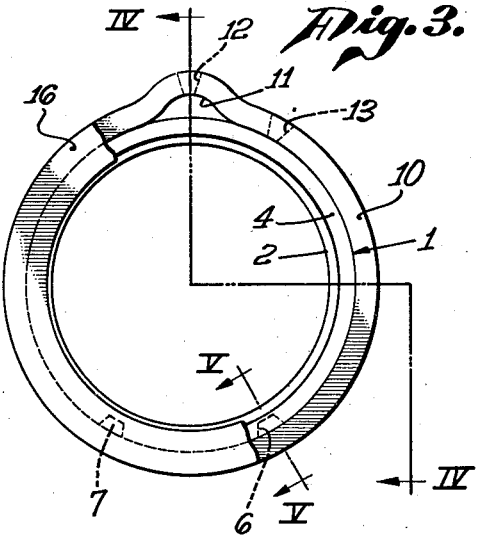
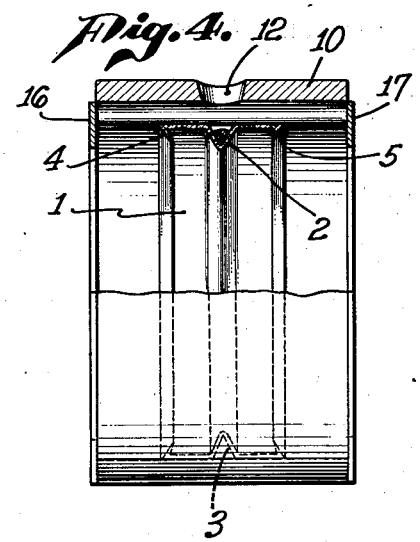
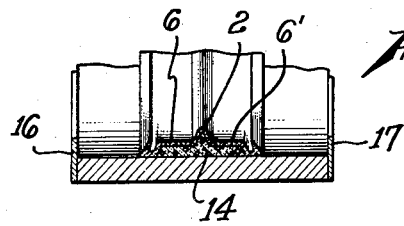
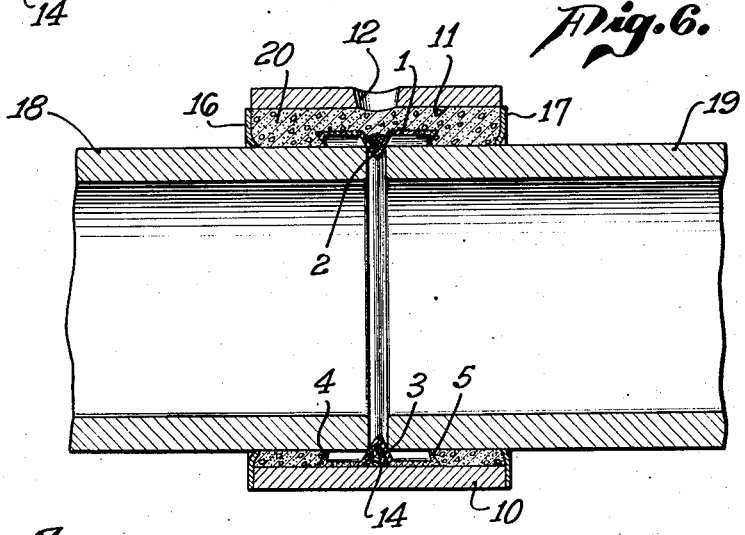
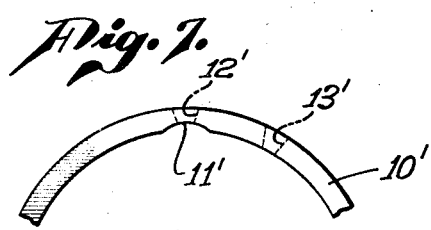
HOWARD W. JEWELL,
INVENTOR.
BY
ATTORNEY.

Patented Oct. 16, 1945

2,386,865

UNITED STATES PATENT OFFICE 2,386,865

PIPE JOINT AND DEVICE THEREFOR

Howard W. Jewell, Los Angeles, Calif.

Application December 20, 1943, Serial No. 514,875

10 Claims. (Cl. 285—114)

This invention pertains to improved means for making joints in pipe, and specifically between abutting ends of ceramic pipe. The means and methods of the invention are particularly adapted for use with sections of pipe of ceramic compositions, cementitious compositions and the like, the resulting joint being strong, leak-proof and resistant to attack by acidic or alkaline solutions flowing through the completed pipe or conduit. Burned clay pipe, whether glazed or unglazed, pipe made of hydraulic cement compositions, and other cementitious or ceramic pipe, are often employed in conveying or disposing of sewage and industrial wastes. Such pipe may also be employed in conveying and distributing water. In the past, much of such pipe was of the bell and spigot type but it has been found that straight end pipe, if properly joined, gives rise to a much stronger construction which resists the stresses imposed upon a pipe line by reason of settlement, superimposed loads, etc.

In my prior Patent No. 2,313,074 I have disclosed a pipe joint in which a collar is employed. Joints made with collars described in the prior patent are extremely strong. However, the collars are expensive to manufacture. The present invention is primarily directed toward an improved type of collar and toward devices whereby collars may be readily made, the resulting collars and joints having certain advantages over the collars described in my former patent.

The present invention is directed toward a molded or formed ring which includes an inwardly extending, circumferentially disposed stop means as well as a seating boss. This ring is adapted to encircle the adjacent ends of pipe sections, the seating boss or bosses supporting the ends of the pipe sections whereas the stop means centers and positions the pipe within the ring.

The invention also contemplates the use of a ceramic collar or hollow sleeve which may be readily extruded and burned. The sleeve is preferably provided with a channel formed in the inner surface of the sleeve and a pour port extending through the wall of the sleeve and communicating with the channel. The seating ring, which is separately formed, may be positioned within the sleeve and cemented into place. The entire assembly is then used in the field in forming a joint between abutting pipe sections. A suitable cementing or sealing composition may be introduced through the pour port and form seals on either side of the ring within the sleeve.

It is an object of the present invention, therefore, to disclose and provide an improved pipe joint.

A further object is to disclose and provide a pipe joint collar comprising a sleeve and a seating ring.

A still further object of the invention is to disclose and provide a seating and centering ring which may be readily formed and cemented into place within a sleeve so as to form an efficient, strong and durable joining collar.

Other objects, advantages and adaptations of the invention will become apparent to those skilled in the art from the following description. Reference will be had to the appended drawings in order to facilitate explanation of the invention.

In the drawings:

Fig. 1 is a perspective of a seating ring.

Fig. 2 is a perspective of an outer sleeve.

Fig. 3 is an end view of a complete collar composed of the seating ring and outer sleeve.

Fig. 4 is a side elevation, partly in section, taken along the plane IV—IV of Fig. 3.

Fig. 5 is a section taken through a portion of the collar along the plane V—V of Fig. 3.

Fig. 6 is a longitudinal section through a completed joint employing the collar shown in Figs. 3, 4 and 5.

Fig. 7 is an end view of a modified form of sleeve.

The seating and centering ring shown in Fig. 1 may be made of any suitable composition or material; papier mâché, chip-board compositions and similar fibrous, felted, readily molded materials may be successfully employed. The ring illustrated comprises a cylindrical, hollow body portion 1 provided with an inwardly extending, circumferentially disposed stop 2 with a concurrent groove 3 in the outer surface of the body portion and externally of the stop means 2. The ends of the ring may be provided with inwardly extending, annular, flexible flange elements 4 and 5. The inner diameters or the diameter at the inner edges of the flange elements 4 and 5 are preferably somewhat less than the average outer diameter of the pipe which is to be received in the seating and centering ring. The smallest internal diameter of the stop means 2 should be appreciably smaller than the outer diameter of the pipe to be received by the ring but not smaller than the internal diameter of such pipe. One or more seating bosses may be formed in the body portion of the ring. Fig. 1 shows a seating boss extending longitudinally and inwardly of the ring, such seating boss having the portions 6 and 6' on either side of the stop means 2. The outer surface of the seating ring exhibits a recess corresponding to the seating boss, the recess communicating with the groove which corresponds with the stop means 2. Two such seating bosses are preferably employed, such seating bosses being separated by say 20° to 45°. The second seating boss is indicated at 7 in Fig. 3.

Seating and centering rings of the character described can be readily made of papier mâché. The outer surfaces, including recesses, grooves, flanges, etc., may form the inner walls of a suction mold so that a coating of paper fibres is deposited from the center onto the perforated walls of the mold. As a result, the entire seating ring may be rapidly made as a unit. The seating rings may be coated or impregnated with a bituminous or asphaltic composition or may be dipped in such composition or sprayed with a lacquer or other compound to impart some additional strength and water resistance to the papier mâché.

Fig. 2 is a perspective of a sleeve made in accordance with the present invention. As there shown, the sleeve is a substantially cylindrical hollow member 10 provided with a channel formed in the inner surface of the sleeve. The channel 11 is substantially parallel to the axis of the sleeve. A pour port 12 extends through the wall of the sleeve and communicates with the channel. The inner diameter of the sleeve is adapted to slidably receive the ring shown in Fig. 1. The sleeve 10 is preferably wider than the ring.

Sleeves such as 10 are preferably made of ceramic material such as clay or clay composition. These sleeves may be readily extruded through a suitable die and cut to desired length. The pour port 12 is cut out while the formed, molded or extruded sleeve is still in the green, unburned condition. Another pour port 13 may also be provided, this pour port extending through the wall of the sleeve midway between the ends of the sleeve.

The inner edge of the port 13 is preferably somewhat below the channel 11 when the channel is at the top of the sleeve. Sleeves of this character should be well burned so that in their finished state or condition they have suitable mechanical strength.

A completed collar is illustrated in Figs. 3, 4 and 5 and shows the inner seating and centering ring in position within the outer sleeve 10. The seating and centering ring may be cemented in position as follows:

After the seating and centering ring is placed within the collar 10, a suitable cement composition is poured through the port 13. The port 13 should communicate with the circumferential groove 3 in the ring so that the cement flows through the port 13 into the groove 3, substantially filling the groove. The seating and centering ring is provided with the seating bosses 6 and 7 and since these bosses are the inward manifestation of recesses formed in the outer surface of the ring and such recesses are in communication with the groove 3, the cement not only fills the groove but also fills the recesses 6 and 7. Upon setting of the cement, the centering and seating ring is not only firmly cemented to the inner walls of the sleeve 10 but in addition the seating bosses have been filled with cementitious composition, thereby giving them desired mechanical strength.

Fig. 5 is a longitudinal section taken through one of the seating bosses and shows the cementitious material 14 filling the recess as well as the groove.

In some instances it is highly desirable to attach, to the ends of the sleeve 10, annular flexible gasketing rings 16 and 17, the inner diameters of these rings being slightly smaller than the outer diameter of the pipe which is to be received by the collar.

The assembly shown in Fig. 4 may be shipped out to the job and there used in connecting the ends of abutting pipe sections. The section through a pipe joint employing the device shown in Figs. 3 and 4 appears in Fig. 6. The sleeve 10 is there shown after the ends of pipe sections 18 and 19 have been inserted thereinto. The ends of the pipe sections are shown abutting the circumferentially disposed stop 2 which thereby assures that each of the pipe ends extends into the device the desired and suitable distance. The inwardly extending flanges 4 and 5 of the ring slidably and yieldably contact with the outer surfaces of the end portions of the pipes. The outer annular flexible gasketing rings 16 and 17 also yieldably engage with the outer surfaces of the end portions of the pipes.

After the entire collar has been placed in position (with the pour port 12 at the top), a suitable sealing compound or cement, preferably in liquid form, is poured through the pour port 12. The cement is indicated at 20 and it will be noted that such cementing composition flows in an axial direction through the channel 11 and then downwardly so as to fill the space between flange 4 and outer gasketing ring 16, as well as between the flange 5 and the outer gasketing ring 17. In this manner, the two lengths of pipe 18 and 19 are positively joined together, the cementing composition 20 not only bonding the outer sleeve 10 to both pipe ends but also to each other. Moreover, the cementing substance or sealing compound positively excludes the passage of fluids from within the pipe sections through the joint.

Various cementing substances may be used. A sulfur-silica cement capable of being liquefied and then setting to an acid-resistant, dense, strong, solid mass upon cooling has been found to be exceptionally well suited wherever the resulting pipe line is to be used in carrying off industrial wastes, sewage or other corrosive or chemically active liquid media. Moreover, it is to be noticed that in the event the adjacent pipe sections rest on uneven ground so that a bending stress at the joint between the pipe sections is imposed thereon, the tendency for the pipes to break adjacent their ends is minimized since the seal is spaced somewhat from the virtually abutting ends of the pipe sections. In Fig. 6 the spacing between the ends of these pipe sections is slightly exaggerated.

In the event the outer gaskets 16 and 17 are not employed, dams of clay, Portland cement or other readily available material may be trowelled around the ends of the sleeve 10 (while it is in position around the joint) so as to prevent the sealing compound 20 from running out of the space between the sleeve and the pipe while such cement is being poured. Resinous compounds, synthetic plastic compounds, bitumastic compounds and hydraulic cement compositions may be used for the sealing compound 20 instead of the sulfur-silica cement specifically referred to hereinabove.

The sleeve specifically shown in Figs. 2, 3 and 4 is provided with a protuberance which corresponds to the channel 11. In some instances it is not necessary to employ a sleeve provided with such protuberance. An alternative form of sleeve is shown in Fig. 7 and it will be noted that in this alternative form the outer surface of the sleeve 10' is circular in cross section. A channel 11' is formed in the inner surface of the sleeve, the wall thickness of the sleeve being slightly reduced in the region of the channel. This modified form of sleeve, in common with the sleeve illustrated in Figs. 2, 3 and 4, is provided with the auxiliary pour port 13' and the main pour port 12' which is in communication with the channel 11'.

The sleeves described herein are preferably made of a burned clay composition and may be glazed or not, depending upon the conditions under which the sleeves are to be used. Sleeves made of hydraulic cement compositions or any other moldable composition of sufficient strength may also be employed. The rings may be made or formed from papier-mâché, as previously stated, or from sheet metal, impregnated fabric or various other compositions. For purposes of economy, papier-mâché ring are preferred. It is to be understood that the rings need not be made of a material which can permanently resist the action of vapors or liquids passing through the completed pipe line. The seal is actually formed by the cementing composition 20. The cementing substance 14, which reinforces the centering ring 2, is generally resistant to the liquids, vapors, etc., within the pipe line so that even though the ring itself is eventually destroyed, the cementing substance 14 remains and continues to virtually fill the space between abutting ends of adjacent pipe sections. Papier-mâché rings impregnated with bitumastic compositions have the further advantage in that they yield somewhat in the event the pipe sections 18 and 19 expand. Moreover, since the ends are not in actual contact with each other, the ends of the pipe do not chip or break off.

It is to be understood that instead of the arrangement of pour ports shown in Fig. 3, other arrangements may be used; for example, three pour ports in axial alignment may be used, the central port permitting cementing of the ring within the sleeve and the side ports permitting cement to be poured into the spaces between the pipe ends and the sleeve. In such case the sleeve need not be provided with an axial channel 11 or 11'.

I claim:

1. A pipe joint collar comprising: an outer, substantially cylindrical, hollow sleeve provided with a channel formed in the inner surface of the sleeve, said channel being substantially parallel to the axis of the sleeve; a pour port extending through the wall of the sleeve and communicating with the channel; and a separately formed seating and centering ring including a hollow, cylindrical body portion, and an inwardly extending, circumferentially disposed recessed stop means carried by the body portion, said seating and centering ring being adapted to be received by the sleeve and cemented therein.

2. A pipe joint collar comprising: an outer, substantially cylindrical, hollow sleeve provided with a channel formed in the inner surface of the sleeve, said channel being substantially parallel to the axis of the sleeve; a pour port extending through the wall of the sleeve and communicating with the channel; a separately formed seating and centering ring including a hollow, cylindrical body portion and an inwardly extending, circumferentially disposed stop means carried by the body portion; and seating bosses formed in the body portion, the stop means extending inwardly to a greater extent than the seating bosses, said separately formed seating and centering ring being adapted to be received by and cemented to the inner surface of the sleeve.

3. A pipe joint collar comprising: an outer, substantially cylindrical, hollow sleeve provided with a channel formed in the inner surface of the sleeve, said channel being substantially parallel to the axis of the sleeve; a pour port extending through the wall of the sleeve and communicating with the channel; a separately formed seating and centering ring including a hollow cylindrical body portion and a separate, inwardly extending, circumferentially disposed stop means carried by the body portion; and inwardly extending annular flexible flange elements at each end of said ring separate and remote from the stop means, said ring being adapted to be slidably received by the sleeve and attached thereto.

4. A pipe joint collar comprising: an outer, substantially cylindrical, hollow sleeve provided with a channel formed in the inner surface of the sleeve, said channel being substantially parallel to the axis of the sleeve; a pour port extending through the wall of the sleeve and communicating with the channel; a separately formed seating and centering ring including a hollow cylindrical body portion and an inwardly extending, circumferentially disposed stop means carried by the body portion; a groove in the outer surface of the body portion externally of the stop means, said ring being adapted to be received by the sleeve; and an auxiliary pour port in the sleeve adapted to communicate with said groove, whereby a cementing compound may be introduced through said auxiliary port to cement and attach said ring to said sleeve.

5. A pipe joint collar comprising: an outer, substantially cylindrical, hollow sleeve provided with a channel formed in the inner surface of the sleeve, said channel being substantially parallel to the axis of the sleeve; a pour port extending through the wall of the sleeve and communicating with the channel; a separately formed seating and centering ring including a hollow cylindrical body portion and an inwardly extending, circumferentially disposed stop means carried by the body portion; a groove in the outer surface of the body portion externally of the stop means; an inwardly extending, longitudinally disposed seating boss formed in the body portion, with a corresponding recess in the outer surface of the body portion, said recess communicating with said groove, said ring being adapted to be received by the sleeve; and a pour port in the collar in communication with said groove, whereby said ring may be cemented to the collar and said groove and boss filled with cement poured through said port.

6. A pipe joint collar comprising: an outer, substantially cylindrical, hollow sleeve provided with a channel formed in the inner surface of the sleeve, said channel being substantially parallel to the axis of the sleeve; a pour port extending through the wall of the sleeve and communicating with the channel; a separately formed seating and centering ring including a hollow cylindrical body portion and an inwardly extending, circumferentially disposed stop means carried by the body portion; a groove in the outer surface of the body portion externally of the stop means; an inwardly extending, longitudinally disposed seating boss formed in the body portion, with a corresponding recess in the outer surface of the body portion, said recess communicating with said groove; inwardly extending, annular, flexible flange elements at each end of said ring, the stop means extending inwardly to a greater extent than the seating boss, said ring being adapted to be received by the sleeve; and a pour port in the collar in communication with said groove, whereby said ring may be cemented to the collar and said groove and boss filled with cement poured through said port.

7. A pipe joint sleeve comprising a substantially cylindrical, hollow sleeve provided with a channel formed in the inner surface of the sleeve, said channel being substantially parallel to the axis of the sleeve and extending outwardly from the nominal inner circumference of the sleeve, and a pour port extending through the wall of the sleeve and communicating with the channel.

8. A pipe joint sleeve comprising a substantially cylindrical, hollow sleeve provided with a channel formed in the inner surface of the sleeve, said channel being substantially parallel to the axis of the sleeve, a pour port in one circumferential position extending through the wall of the sleeve and communicating with the channel, and an auxiliary port in another circumferential position extending through the wall of the sleeve and not in communication with the said channel, said auxiliary port being adjacent to said channel.

9. A seating and centering ring including a hollow, cylindrical body portion, an inwardly extending, circumferentially disposed stop means carried by the body portion, a groove in the outer surface of the body portion externally of the stop means, inwardly extending, longitudinally disposed seating bosses formed in the body portion with corresponding recesses in the outer surfaces of the body portion, said recesses communicating with said groove, the stop means extending inwardly to a greater extent than the seating bosses.

10. A seating and centering ring including a hollow, cylindrical body portion, an inwardly extending, circumferentially disposed stop means carried by the body portion, a groove in the outer surface of the body portion externally of the stop means, inwardly extending, longitudinally disposed seating bosses formed in the body portion with corresponding recesses in the outer surfaces of the body portion, said recesses communicating with said groove, and inwardly extending, annular, flexible flange elements at each end of said ring.

HOWARD W. JEWELL.